(12) United States Patent
Asbury (10) Patent No.: US 7,802,408 B2
(45) Date of Patent: Sep. 28, 2010

(54) PANEL JOINING MEMBER

(75) Inventor: Anthony Asbury, Norwich (GB)

(73) Assignee: Quentor Limited, Norwich, Norfolk (GB)

( * ) Notice: Subject to any disclaimer, the term of this patent is extended or adjusted under 35 U.S.C. 154(b) by 876 days.

(21) Appl. No.: 10/516,436

(22) PCT Filed: Jun. 2, 2003

(86) PCT No.: PCT/GB03/02401

§ 371 (c)(1),
(2), (4) Date: Oct. 26, 2005

(87) PCT Pub. No.: WO03/102430

PCT Pub. Date: Dec. 11, 2003

(65) Prior Publication Data

US 2006/0096224 A1    May 11, 2006

(30) Foreign Application Priority Data

Jun. 1, 2002    (GB) ................. 0212816.3
Dec. 24, 2002   (GB) ................. 0229990.7

(51) Int. Cl.
*E04B 1/38* (2006.01)
(52) U.S. Cl. .................... 52/282.4; 52/745.2; 52/780; 403/21; 403/408.1
(58) Field of Classification Search ........... 52/587.1, 52/800.12, 716.8, 780, 781, 282.1, 282.2, 52/282.3, 282.4, 275, 364, 235, 745.2, 745.19; 403/408.1, 21, 22, 299; 411/84, 85; 190/24, 190/107, 122
See application file for complete search history.

(56) References Cited

U.S. PATENT DOCUMENTS

| | | | | |
|---|---|---|---|---|
| 1,669,187 A | * | 5/1928 | Campbell | 403/21 |
| 1,813,909 A | * | 7/1931 | Brainard et al. | 52/601 |
| 2,252,379 A | * | 8/1941 | Johns | 52/166 |
| 2,429,833 A | * | 10/1947 | Luce | 411/84 |
| 2,448,031 A | * | 8/1948 | Johnson et al. | 217/65 |
| 2,932,369 A | * | 4/1960 | Huguenin | 403/22 |

(Continued)

FOREIGN PATENT DOCUMENTS

DE      4102164     7/1992

(Continued)

*Primary Examiner*—Robert J Canfield
*Assistant Examiner*—Brent W Herring
(74) *Attorney, Agent, or Firm*—Galgano & Associates, PLLC; Thomas M. Galgano; Jessica G. Bower (57) ABSTRACT

A method of connecting a panel (50) to a panel joining member (51) is disclosed. The method includes the steps of forming a recess (16) adjacent to an edge of a panel. The panel (50) is located within a panel joining member (51) the panel (50) being located against a stop member (15) and the recess (16) being aligned with an aperture (18) in the wall (13B) of the joining member (51). A fastener (17) is passed through the aperture (18) and urges the panel towards the outer wall (15) of the joining member (51). A receiver (30) is inserted into the recess (16) to assist engagement of the panel (50) with the fastener (17). The receiver (30) has a shape complementary to that of the recess (16). Opposing walls (13A, 13B) of the joining member (51) are inclined towards one another to improve panel retention. A push or snap-fit join is included to facilitate assembly.

61 Claims, 6 Drawing Sheets

U.S. PATENT DOCUMENTS

| | | | | |
|---|---|---|---|---|
| 2,976,969 | A * | 3/1961 | Gillespie | 52/464 |
| 3,070,646 | A * | 12/1962 | Lindgren | 174/373 |
| 3,110,372 | A * | 11/1963 | Pierce et al. | 403/21 |
| 3,370,871 | A * | 2/1968 | Ampelio | 403/219 |
| 3,381,430 | A * | 5/1968 | Wiczer | 52/282.3 |
| 3,451,181 | A * | 6/1969 | Neuschotz | 52/787.1 |
| 3,559,357 | A * | 2/1971 | Lowe | 52/282.4 |
| 3,579,942 | A * | 5/1971 | Cole | 52/787.12 |
| 3,675,954 | A * | 7/1972 | Konig | 52/795.1 |
| 3,782,048 | A * | 1/1974 | Corman | 52/282.2 |
| 3,861,101 | A | 1/1975 | Wisson | |
| 3,866,373 | A * | 2/1975 | Hudock | 52/309.1 |
| 3,866,381 | A * | 2/1975 | Eschbach et al. | 52/766 |
| 3,885,765 | A * | 5/1975 | Richards | 248/188.1 |
| 4,021,129 | A * | 5/1977 | Sykes | 403/252 |
| 4,193,162 | A * | 3/1980 | Larssen | 16/2.2 |
| 4,309,856 | A * | 1/1982 | Varnau et al. | 439/74 |
| 4,372,701 | A * | 2/1983 | Watanabe | 403/24 |
| 4,428,705 | A * | 1/1984 | Gelhard | 411/82.1 |
| 4,513,552 | A * | 4/1985 | Breithaupt | 52/204.597 |
| 4,680,206 | A * | 7/1987 | Yoxon et al. | 428/34 |
| 4,714,367 | A * | 12/1987 | Baus | 403/104 |
| 4,729,705 | A * | 3/1988 | Higgins | 411/82 |
| 4,964,252 | A * | 10/1990 | Guliker | 52/275 |
| 5,240,543 | A * | 8/1993 | Fetterhoff et al. | 156/293 |
| 5,380,382 | A * | 1/1995 | Izdebski | 156/91 |
| 5,443,343 | A * | 8/1995 | Mutz et al. | 411/30 |
| 5,791,845 | A * | 8/1998 | Fulop | 411/42 |
| 5,826,380 | A * | 10/1998 | Wolfe | 52/90.1 |
| 6,119,410 | A * | 9/2000 | Wolfe | 52/71 |
| 6,164,885 | A * | 12/2000 | Roytberg et al. | 411/61 |
| 6,497,082 | B1 * | 12/2002 | Toyoda et al. | 52/787.1 |
| 6,505,448 | B2 * | 1/2003 | Ito | 52/474 |
| 6,604,616 | B2 * | 8/2003 | Cheng | 190/24 |
| 7,096,637 | B2 * | 8/2006 | McMillan | 52/653.1 |
| 7,219,681 | B1 * | 5/2007 | Hamilton-Jones | 135/123 |
| 7,685,781 | B1 * | 3/2010 | Hatch | 52/169.12 |
| 2002/0110416 | A1 * | 8/2002 | Tang et al. | 403/408.1 |
| 2005/0188634 | A1 * | 9/2005 | Bolton et al. | 52/235 |

FOREIGN PATENT DOCUMENTS

| | | |
|---|---|---|
| EP | 1179683 | 2/2002 |
| FR | 2207544 | 6/1974 |
| FR | 2450374 | 9/1980 |
| GB | 2241466 | 9/1991 |

* cited by examiner

PANEL JOINING MEMBER

FIELD OF THE INVENTION

The present invention relates to a joining member for holding together two or more panels. The invention further relates to a method of assembling said panels to construct, for example, structural or partition walls, flooring and roofing, furniture, containers or luggage.

BACKGROUND OF THE INVENTION

The assembly of large scale articles such as partition walls, furniture and transport containers by joining together smaller units, particularly panels, is well known in the art. Depending on the nature of the joint between adjacent units, articles of different strengths and function can be produced. For example, where a partition wall is to be formed, the individual units need to be retained in the desired orientation, but need not necessarily be required to be joined together in a robust fashion to withstand impacts.

Where, however the units are to form part of a container, and particularly where the article is an item of luggage, the joints usually need to be able to withstand a large amount of strain from the weight of the contents and be able to stand up to, for example, airport luggage handling techniques, which can often involve the luggage receiving a number of impacts.

In the art, it has been a standard approach when joining panels together to insert a panel into a moulded extrusion and secure the panel in place by a fastening method such as gluing, riveting or screwing through the outer face of the outer wall of the extrusion into the face of the panel. The screw bites into the panel and as the screw is tightened the panel is drawn into contact with the inner face of the extrusion's outer wall.

The above approach has a number of drawbacks. Firstly, the stress from tightening the screw is concentrated on the outer wall of the extrusion and panel skin. Where, for example, the panels form part of a piece of luggage or cladding on a building, then the sealing joint between the panel and extrusion will be less efficient and the exterior appearance of the joint will not be so pleasing. Also, if the panel width is narrower than the extrusion's channel width, then additional packing, adhesive bonds or the like may be required between the face of the panel and the extrusion's walls to maintain the spatial relationship between the panel and the extrusion's wall.

It is an object of the present invention to seek to alleviate the above problems.

SUMMARY OF THE INVENTION

According to a first aspect of the invention, there is provided, a method of connecting a panel to a panel joining member, the method including the steps of:
forming a recess adjacent an edge of a panel;
locating said panel edge within a panel receiving portion of a panel joining member;
locating said panel against a stop member and aligning the recess with a fastener aperture formed in an inner wall of the panel receiving portion;
inserting a fastener through the aperture into the corresponding recess in the panel, the fastener urging the panel towards the outer wall of the panel receiving portion. The panel can be easily inserted into the joining member and undesirable stresses in the panel are minimised.

Preferably, a receiver is inserted into the recess prior to the panel being located within the panel joining member.

Advantageously, an adhesive is introduced between the panel and one or more walls of the joining member to increase the strength of the joint. Optionally, an adhesive bond weld is introduced when the fastener has been tightened substantially.

Optionally, the fastener is an expanding rivet fastener to engage the panel tightly. Advantageously, the fastener has a screw-thread to engage the panel and/or panel joining member.

Preferably, the fastener receiver is an adapter, the adapter having a shape complementary to that of the recess. The adapter provides a substrate for the screw to grip. The recess optionally narrows away from its open end to ensure that the material from which the adapter is formed undergoes plastic flow around the thread as the threaded fastener is tightened. The material which flows reduces the transmission of any vibrations to the fastener arising, for example from transportation. The vibrations act to cause the screw to loosen and hence the joint to become weaker.

Preferably the fastener is introduced into the fastener receiver at an angle inclined to the axis perpendicular to the surface of the panel. The angle encourages greater engagement of the panel or the fastener receiver with the fastener and can urge the panel against the stop members.

The or each panel optionally includes one or more projections to engage a corresponding recess in a panel joining member thereby forming a push-fit type joint. The use of push-fit joint enables rapid assembly together of panels which assembly can be accomplished with relatively unskilled labour. Advantageously, opposing walls of the panel joining member are inclined together at an angle of up to 5°. The incline angle is particularly advantageously 0.7° to 2°.

The or each panel joining member preferably includes a chamfered edge to facilitate insertion of a panel into the panel joining member.

According to a further aspect of the invention, there is provided a panel joining member comprising a joining element having at least one panel receiving portion and at least one fastening assembly,
the or each fastening assembly comprising a fastener and a fastener receiver, wherein the or each panel receiving portion is defined by spaced opposing walls including a panel stop member, located on at least one of the inner facing surfaces of said opposing walls, and in which a fastener aperture is located through one of said spaced opposing walls.

Preferably, where two panel receiving portions subtend an angle of less than 180°, the fastener aperture is located in the internal wall of the joining member.

This arrangement facilitates the alignment of a panel against a stop member to position a panel for securing thereto by said fastening assembly.

Advantageously, the fastener receiver of the fastener assembly is secured within a panel along a selected panel edge for inserting into a panel receiving portion. The fastener receiver would normally be profiled in a manner to facilitate its correct orientation for insertion into the said panel.

In one arrangement, the fastener receiver comprises a body adapted for engagement with a panel, the body including an open mouthed recess for receiving a fastener.

Optionally, the recess narrows away from the open mouth.
Preferably, the fastener is a screw having a flat ended shank.

According to a yet further aspect of the invention there is provided an adapter to receive a fastener for insertion into a panel recess, the adapter comprising a first opening having a diameter greater than that of said fastener. Optionally, the opening is narrower at its closed end to grip the end of a fastener. Advantageously, both the first opening and the narrowing are cylindrical, with the cylinders optionally co-axial.

According to a still yet further aspect of the invention, there is provided a panel joint, the panel joint comprising;

a panel an edge of which is locally flat and which flat region includes a recess;

a joining member, the joining member having spaced opposed walls to receive the panel;

one or more stop members against which a panel is aligned; the joining member having an aperture in one of said walls to enable a fastening member to pass through the joining member and engage the panel, thereby urging the panel against the opposite wall of the joining member.

Advantageously, the joint includes adhesive between the panel and one or more walls of the joining member to increase the strength of the joint. Optionally, the joint further includes an adhesive bond weld.

Preferably, an adapter is located in the recess, the adapter having a shape complementary to that of the recess. The adapter optionally narrows away from its open end to ensure that the material from which the adapter is formed undergoes plastic flow around the fastening member as the fastening member is fully engaged. The material which flows reduces the transmission of any vibrations to the fastening member arising, for example from transportation. The vibrations act to cause the fastening member to loosen and hence the joint to become weaker. Preferably, the fastening member includes a screw thread to engage the joining member.

Conveniently, the recess includes an aperture to receive a nut into which the fastening member can be screwed, the member and the nut co-operatively engaging to lock the nut against the inner wall. The compressive pre-load force is maintained by the elastic spring effect of the inner-wall.

Preferably the fastening member is aligned along an axis which is at an angle inclined to the axis perpendicular to the surface of the panel. The angle causes greater engagement of the fastening member with the material into which it is being screwed.

BRIEF DESCRIPTION OF THE DRAWINGS

The invention will now be described with reference to the accompanying drawings which show by way of example only three embodiments of a joint for panels. In the drawings:

FIG. 7 a-e illustrates elements of a panel.

DETAILED DESCRIPTION OF THE INVENTION

Figure 1:
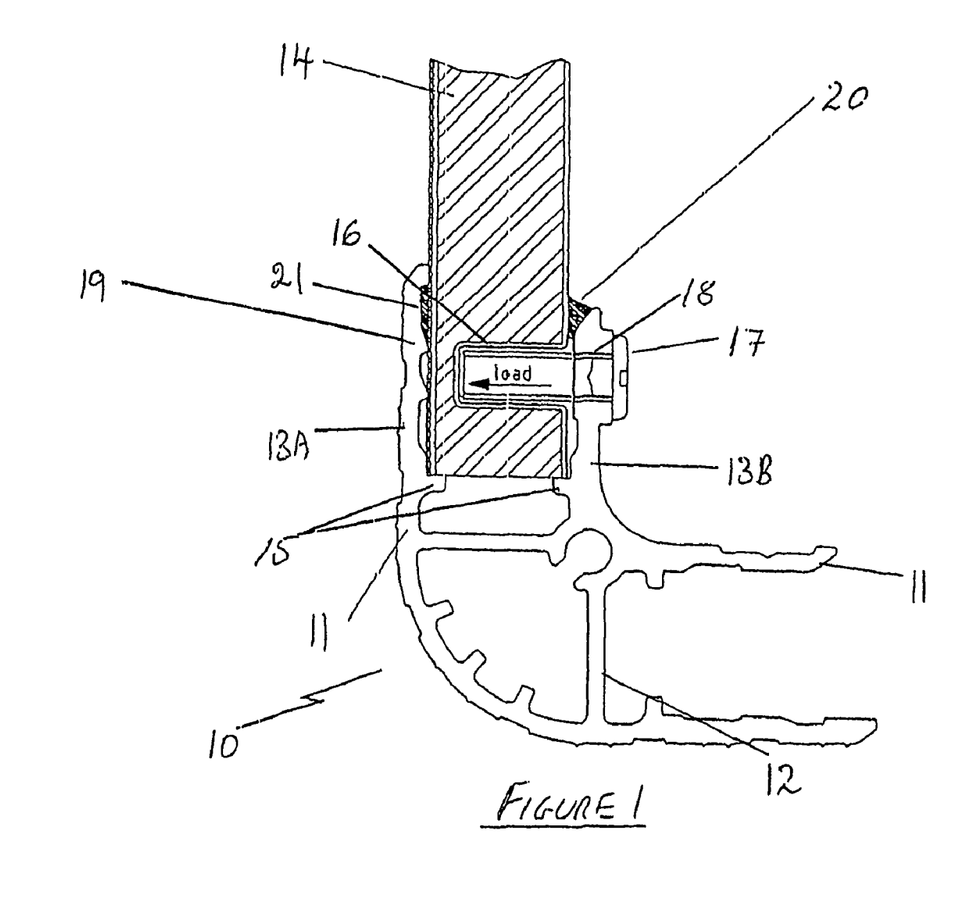
FIG. 1 is a sectional view through a first embodiment of a joint.

Referring initially to FIG. 1, this shows a first embodiment of a coupling means for securing panels together to form an article. The panels can be used in the construction of containers such as hand-portable cases or those which are to contain larger loads to be transported on lorries or ships. The containers are of modular construction and can be easily assembled either by the panel manufacturer or at a separate production site. Alternatively, panels can be joined together to form, for example, a partition wall.

The coupling means shown in FIG. 1 comprises a joining element 10. The joining element 10 can be formed from an extruded plastics material having good impact and scuff resistance or a metal (such as extruded aluminium). Two panel retaining portions 11 of the joining element 10 are at right angles to each other and separated by strengthening walls 12. Joining elements can be produced however with retaining portions at other desired angles, for example 180°. Each retaining portion 11 has flexible side walls 13A, 13B to enable a panel 14 to be easily inserted therebetween. Adhesive 21 is introduced between the panel 14 and the outer wall 13A of the joining element 10. Positioning of the panel 14 into the desired location and orientation is facilitated by stop members 15 on the inside of the retaining portion 11.

A further feature of the invention is the option of adding a hole-reinforcing adapter to the hole 16 in the in-use inner wall of the panel 14. The hole 16 enables a flat-ended load screw 17 to be passed through a threaded hole 18 in the inner wall 13B of the retaining element 10. The adapter would normally have a bore diameter slightly larger than the outer diameter of the fastening screw. As the screw 17 is screwed into the panel 14 therefore, the panel 14 is pushed against the wall 13A. In order to further secure the panel 14 to the walls 13A,B, adhesive can be included.

A number of barbs 19 can also be included in the inner surface of the inner walls 13A to provide further grip on a panel 14. A bond weld 20, which can take the form of further adhesive or a sealant compound can be included. The bond weld 20 performs a number of functions. Firstly, it provides further bonding between the panel 14 and the wall 13B. Secondly, it closes any remaining gaps between these two elements and improves the sealing and the appearance of the finished article.

The joint which is achieved by the above has advantages over conventional joints. Firstly, from a security point of view, as screw heads are normally on the inside of the finished article, the screws cannot be removed to facilitate access to the article. Secondly, from an aesthetic view point, the appearance of the article is improved. Thirdly, with conventional articles of similar construction, the inner face of the wall 13A may be pulled away from the panel during manufacture, a problem which is obviated by the current invention. Fourthly, the inner wall 13B remains mechanically coupled to the panel 14.

Figure 2:
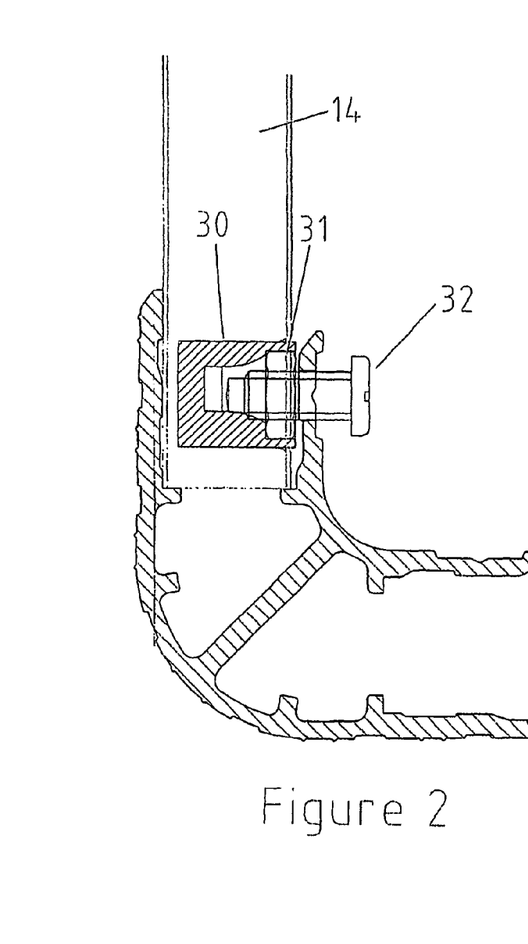
FIG. 2 is a sectional view through a second embodiment of a joint showing the arrangement just after the locating/fastening screw has been introduced.
Figure 3:
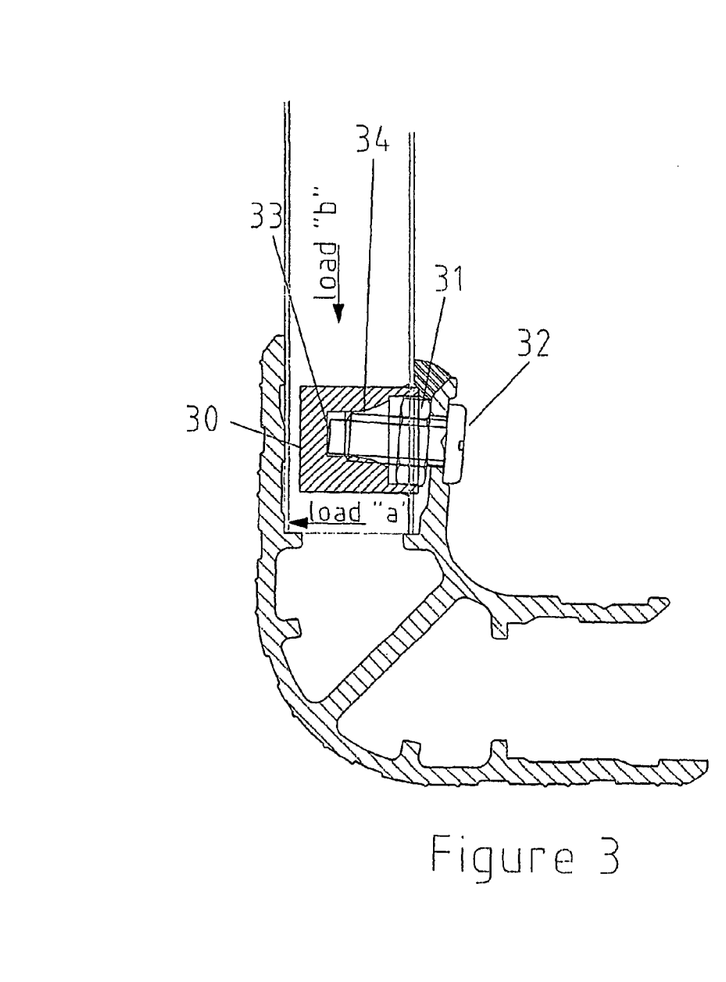
FIG. 3 is a sectional view through the second embodiment of the joint showing the fastening means fully engaged.

An alternative embodiment of a coupling means is disclosed in FIGS. 2 and 3. The features of the joining element and the panel are substantially as described above in relation to FIG. 1. In addition however, the embodiment of FIG. 2 includes a retention adapter 30 which fits into a correspondingly shaped hole within the panel 14. The retention adapter 30 has a recess to engage and retain in position a reaction and locking nut 31. The recess preferably has the same cross-section as the locking nut to improve the grip on and prevent rotation of the locking nut 31 as the screw 32 is tightened.

As the screw 32 is tightened, the wall 13B is put under compression and the panel 14 and the wall 13B are pushed apart. Furthermore, a load arises which tends to push the panel 14 against the outer wall 13A. As the screw 32 is tightened further it pushes against an end section 33 of the hole 34. The end face of the screw reacts onto the end section 33 and causes the locknut to ease out of its recess towards the inner, panel-side face of the wall 13B, ultimately causing the screw to lock securely against the wall 13B and preserving the compressing preload force by means of the elastic spring effect of the wall 13B. The diameter of the closed end of the hole 34 is smaller than that of the screw 32 and undergoes plastic deformation. The deformation results in the plastic flowing into the thread of the screw and provides, in the finished product, anti-vibration pressure. The plastic will act to hold the screw 32 in position and therefore during transportation of an article which includes a fastening as described above, any vibrations such as from a vehicle will not cause the screw to come loose.

As with the joint shown in FIG. 1, adhesives and bond welds can be applied to improve the strength and appearance of the joint. Barbs and profiling of outer the wall 13A may also be employed to refine the system. Furthermore, rivets may be used as alternatives to or in addition to a screw-type fastening.

The embodiment of the invention shown in FIGS. 2 and 3, includes the additional feature that the hole 34 is slightly eccentric. The eccentricity of the hole causes the screw 32 to be guided into position and also to grip and hold the panel more tightly in the required position urging it against stop members 15. In some circumstances this option is not required and an embodiment utilising a concentric arrangement of hole 34 would suffice.

An advantage of the above described invention is that the panels can be easily assembled together. In that sense the individual components can be manufactured and subsequently dispatched to be assembled by relatively unskilled workers.

Figure 4:
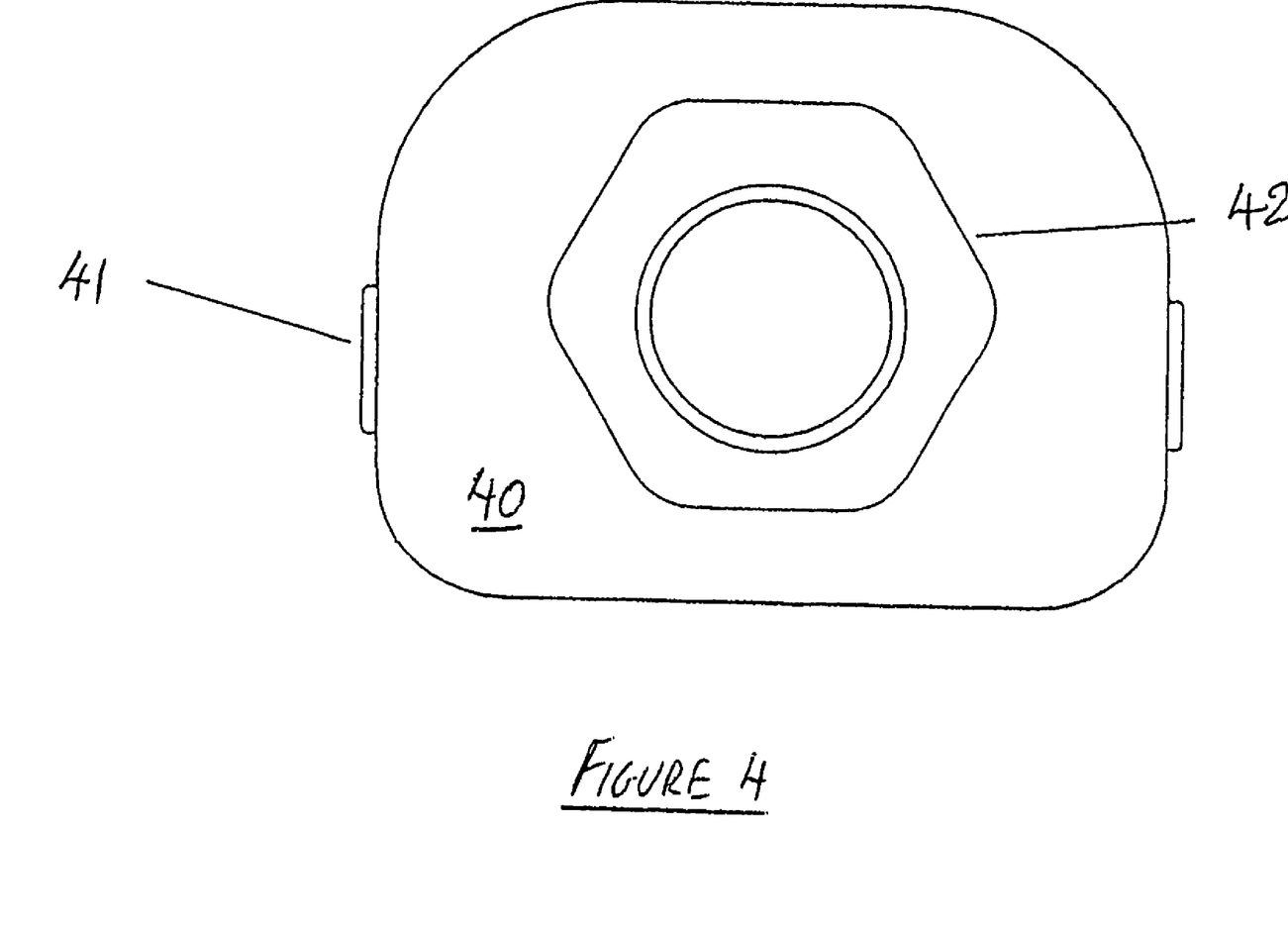
FIG. 4 is a plan view of a retention adapter.

The retention adapter 40 as shown in FIG. 4 has barbs 41 to prevent the adapter 40 from being lifted out of the hole in the panel 14 prior to the panel being engaged into the joining member. A recess 42 which can accommodate a locking nut having a hexagonal cross-section is shown.

In use, when two or more panels are to be joined together, a panel according to the above invention is taken. A retention adapter, if not already present is inserted into a corresponding hole within the panel and a locking nut located in the aperture provided in the adapter. The panel is brought in to correct alignment with a joining member, between two retaining walls of said joining member. An adhesive can be applied at this stage between the wall of the panel and the inner face of the retaining wall 13A of the joining member.

Alignment is achieved by locating the edge of the panel against the stop members in the joining member and ensuring that a clearance hole in the joining member is over the locking nut opening. A screw is then screwed in through the joining member and into the retaining member. The screw may be profiled with a reduced-diameter lead-in section so as to help guide it into the appropriate female section. As the screw is tightened, the outer wall and the panel are brought together. Once the screw has been tightened, the joint produced can be sealed and further strengthened on the inner wall 13B of the joining member using a bond weld.

Figure 5:
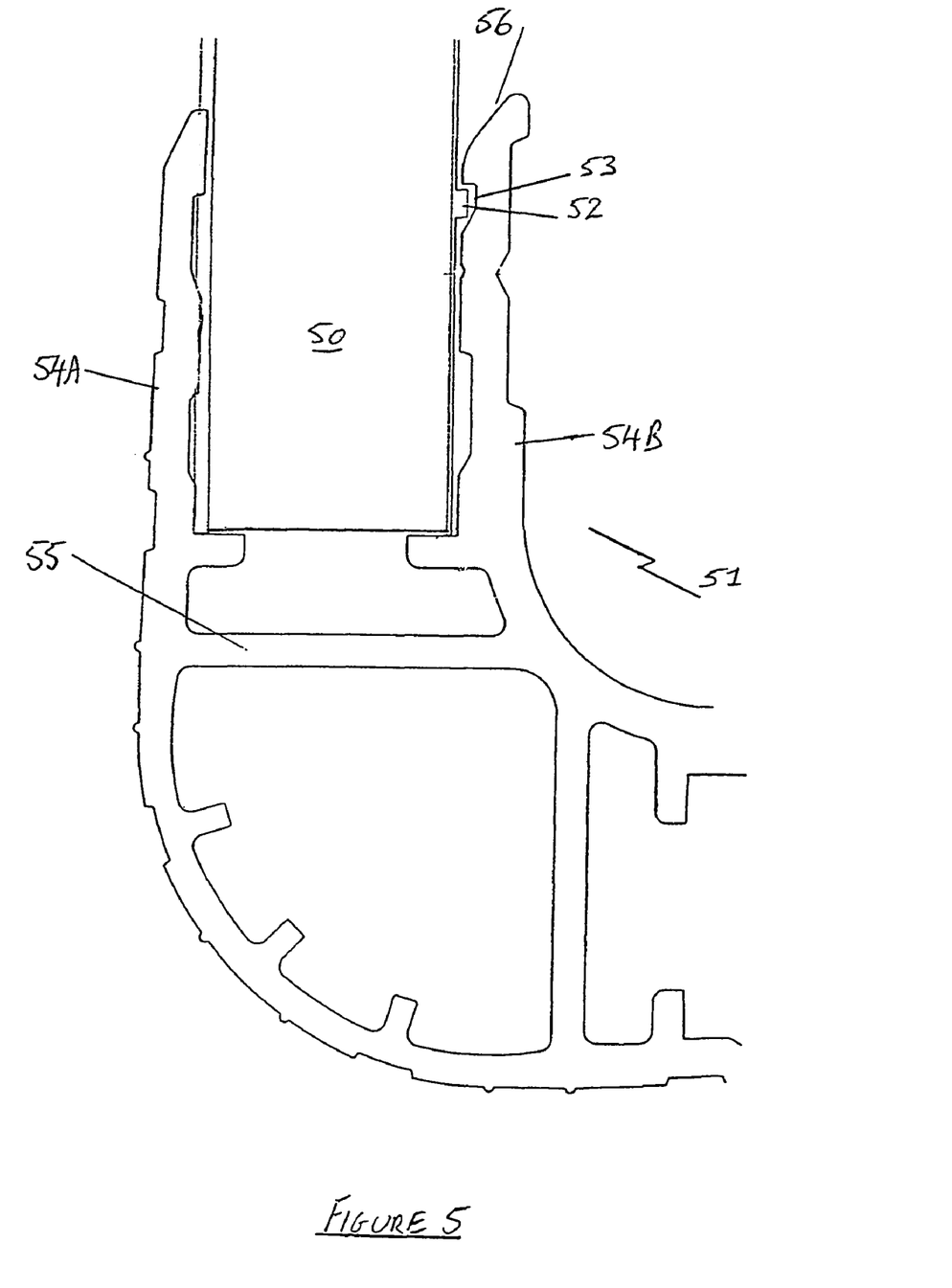
FIG. 5 is a sectional view through a joint having a snap or push-fit fastening.

A further aspect of the present invention is shown in FIG. 5 in which a panel 50 is held into position with a joining element 51 by means of a push or snap-fit mechanism. The push or snap-fit biases the panel 50 towards the inside face of the outer wall 54A of the joining member 51. In order to effect the joint, panel 50 has a raised ridge 52 running along its length (see FIG. 6). The ridge 52 engages a recess 53 in the joining element 51 and co-operates to retain the panel 50 rigidly in position. The joining element 51 shown in FIG. 5 is substantially similar to that shown in FIG. 1, with a primary difference being the lack of a hole through which a screw can pass.

In order to provide an even stronger bond, the joining element 51 can be provided with non-parallel sides 54A, 54B which are inclined towards one another. For example, whist the outer wall 54A is at right angles to the strut 55, the inner wall 54B is inclined at an angle towards the outer wall 54A typically an angle of up to 5° has been shown to give a good joint, although angles of from 0.7° to 2° have been found to be most effective.

Furthermore, the joining element 51 includes a chamfered edge 56. The chamfered edge 56 facilitates insertion of a panel 50 into the joining element 51 during the assembly process.

The push-fit mechanism can be used in conjunction with the features relating to the adapter/screw mechanism shown in FIGS. 1 to 4.

Alternatives to a single ridge along the length of the panel, a number of other features can be used. For example, a castellated projection or even a series of staples whose heads protrude from the panel could also be used. Furthermore, any ridge or projection does not have to run parallel to the edge but could also be disposed at other angles with a proviso that the panel joining member has a corresponding recess to engage ridge or projection.

The panels as used herein are primarily sheet materials which are locally planar along their edge, enabling them to be joined to other panels. The panels can be constructed from materials formed by the pressure bonding of a plurality of layers and having rigid outer layer and a lightweight inner layer. The outer layer can be formed from a number of layers or skins, for example plywood, MDF or plastics material. The inner layer can be formed from a lightweight material such as a plastic or aluminium and have a honeycomb structure which can impart strength and rigidity whilst reducing weight. Alternatively, the sheet material can be a single layer of wood, plastic or metal.

Figure 6:
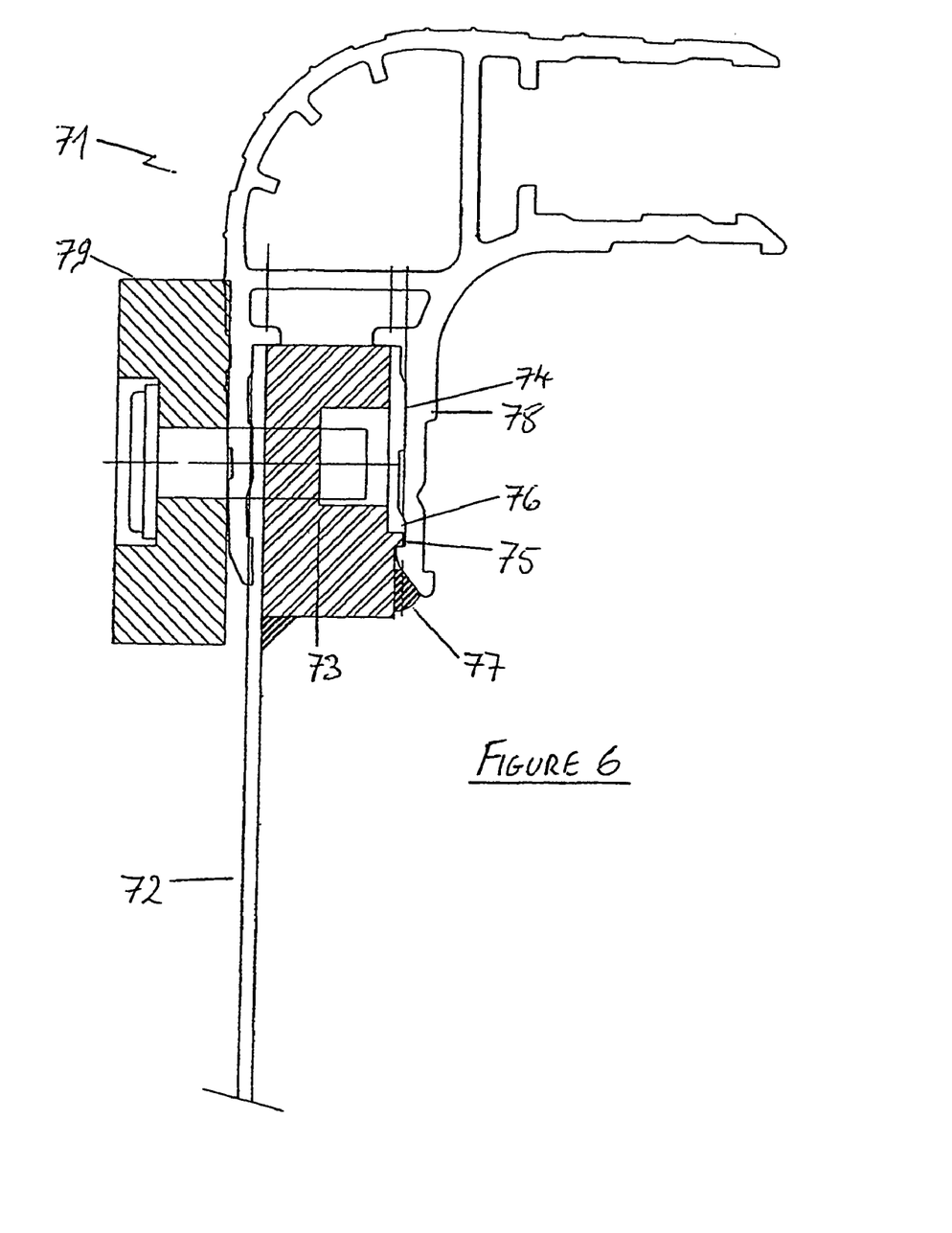
FIG. 6 is a sectional view through a further joint having a snap or push-fit fastening.
Figure 7A:
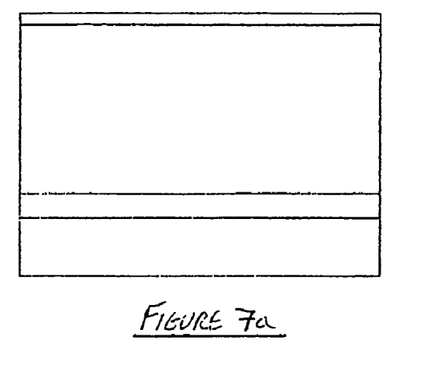
Figure 7B:
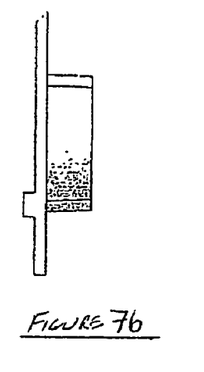
Figure 7C:
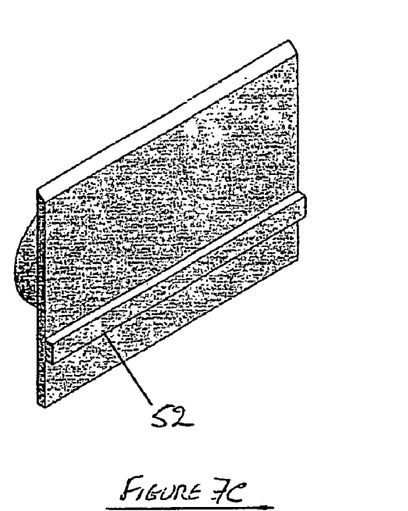
Figure 7D:
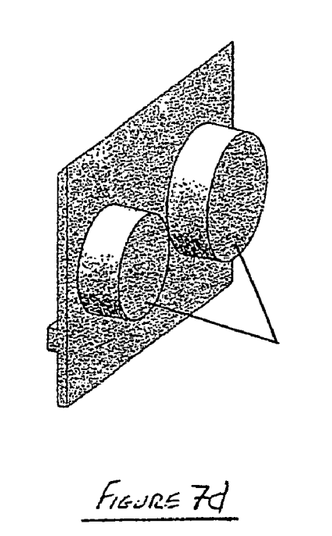
Figure 7E:
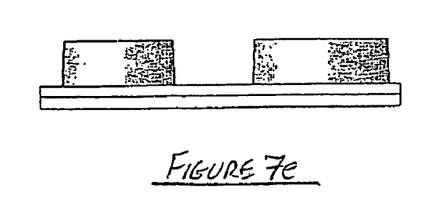

An alternative aspect of the invention is shown in FIG. 6. The features shown here are suitable for use in cases for transporting goods and materials. The joining element 71 is similar to that shown in FIG. 5, and in this instance is to form a corner of the base of a suitcase or packing case. The wall 72 of the case is planar having a thickness of approximately 1 mm. It is therefore far thinner and lighter than other wall panels described above in relation to the other figures. The case produced is therefore lighter and has a greater internal volume. In order to retain the wall 72 in position a retaining element 73 is inserted between the wall 72 and the internal edge 74 of the joining element 71. The retaining element 73 engages the internal edge 74 by means of a push-fit mechanism, a ridge 75 on the retaining element 73 engaging the recess 76 of the joining element 71. An adhesive 77 is added to further secure the components together. The joint formed can be further secured by passing a securing element such as a screw or rivet through the internal wall 78 into the retaining element 73. In the particular example shown here, a foot 79 is secured to the joining element 71 to provide protection for the case when the case rests on the floor.

It can be noted that elements, (as shown in FIG. 7) smaller than a normal panel but having the same configuration can be slotted, by means of the projections 80 into larger panel elements to provide the larger panel elements with the projections required for push or snap-fit assembly.

It will of course be understood that the invention is not limited to the specific details described herein, which are given by way of example only, and that various modifications and alterations are possible within the scope of the invention.

The invention claimed is:

1. A panel joint, comprising:
    a panel having an inner surface, an outer surface, at least one end and a fastener-receiving cavity formed within said panel which opens onto said inner surface, generally adjacent to said one end of said panel;

a panel joining member having opposed, spaced-apart inner and outer sidewalls which define therebetween a panel-receiving cavity for receipt therein of said one end of said panel, said inner sidewall of said panel joining member having an aperture formed therethrough which is positioned to align with said fastener-receiving cavity when said one end of said panel is received with said panel-receiving cavity;

at least one stop member formed on said panel joining member adjacent to said panel-receiving cavity against which said one end of said panel abuts when fully inserted into said panel-receiving cavity;

a screw-threaded fastener removably insertable through said aperture of said inner sidewall of said panel joining member and into said fastener-receiving cavity to enable said fastener to engage said panel and urge the outer surface of said panel against the outer sidewall of said panel joining member, said fastener-receiving cavity including an aperture to receive a nut into which said fastener can be screwed, the panel joining member and the nut cooperatively engaging to lock the nut against the inner sidewall of the panel joining member; and an adapter to receive said fastener and for insertion into said fastener-receiving cavity, the adapter comprising an opening having an open end having a mouth and a closed end, to receive said fastener, the mouth of the opening having a diameter greater than that of said fastener.

2. The panel joint according to claim 1, wherein the opening includes a narrowing at its closed end to grip the end of a fastener.

3. The panel joint according to claim 2, wherein the opening and the narrowing are cylindrical.

4. The panel joint according to claim 3, wherein the cylindrical opening and the narrowing are co-axial.

5. The panel joint according to claim 1, further comprising:
an adhesive disposed between the panel and at least one sidewall of the panel joining member to increase the strength of the joint.

6. The panel joint according to claim 5, further comprising:
an adapter located in said fastener-receiving cavity, the adapter having a shape complementary to that of said fastener-receiving cavity.

7. The panel joint according to claim 1, further comprising:
an adapter having an open end located in said fastener-receiving cavity, the adapter having a shape complementary to that of said fastener-receiving cavity.

8. The panel joint according to claim 7, wherein the adapter narrows away from its open end to ensure that the material from which the adapter is formed undergoes plastic flow around the fastening member as the fastening member is fully engaged.

9. The panel joint according to claim 1, wherein said fastener includes a screw thread to engage the panel joining member.

10. The panel joint according to claim 1, wherein said fastener is aligned along an axis which is at an angle inclined to the axis perpendicular to the surface of the panel.

11. In a method of connecting a panel to a panel joining member employing a panel assembly of the type comprising, a panel having an inner surface, an outer surface, and at least one end, a panel joining member having opposed, spaced-apart inner and outer sidewalls which define therebetween a panel-receiving cavity, said inner sidewall of said panel joining member having an aperture formed therethrough, at least one stop member formed on said panel joining member adjacent to said panel-receiving cavity, and a fastener including a screw-thread, the method comprising the steps of:

forming a fastener-receiving cavity within said panel which opens onto said inner surface, generally adjacent to said one end of said panel;

inserting a receiver into said fastener-receiving cavity;

forming an aperture in the open end of said fastener receiving cavity and inserting said one end of said panel into said panel-receiving cavity of said panel joining member;

abutting said one end of said panel against said one stop member and aligning said fastener-receiving cavity of said panel with said aperture of said inner sidewall of said panel joining member; and inserting said fastener through said aperture of said inner sidewall of said panel joining member and screwing the fastener into a nut and into said fastener-receiving cavity of said panel to enable said fastener to engage said panel and urge the outer surface of said panel against the outer sidewall of said panel joining member, the nut and the panel joining member operating to lock the nut against the inner sidewall of the panel joining member.

12. The method according to claim 11, comprising the further step of:
introducing an adhesive between the panel and at least one of the sidewalls of the panel joining member.

13. The method according to claim 12, comprising the further step of:
substantially tightening said fastener and forming an adhesive bond weld between the panel and the sidewall of the panel joining member when the fastener has been tightened substantially.

14. The method according to claim 11, wherein the fastener is an expanding rivet fastener to enable it to engage the panel tightly.

15. The method according to claim 11, wherein the fastener has a screw-thread to engage at least one of said panel and said panel joining member.

16. The method according to claim 11, wherein the receiver is an adapter, the adapter having a shape complementary to that of the fastener-receiving cavity.

17. The method according to claim 11, wherein the fastener-receiving cavity has an open end and narrows away from its open end.

18. The method according to claim 11, additionally including the step of introducing said fastener into the receiver at an angle inclined to the axis perpendicular to the surface of the panel.

19. The method according to claim 11, wherein the panel includes at least one projection to engage a corresponding recess in a panel joining member thereby forming a push-fit type joint.

20. The method according to claim 11, wherein opposing sidewalls of the panel joining member are inclined together at an angle of up to 5°.

21. The method according to claim 20, wherein the incline angle is from 0.7° to 2°.

22. A panel joint, comprising:
a panel having an inner surface, an outer surface, at least one end and a fastener-receiving cavity formed within said panel which opens onto said inner surface, generally adjacent to said one end of said panel;

a panel joining member having opposed, spaced-apart inner and outer sidewalls which define therebetween a panel-receiving cavity for receipt therein of said one end of said panel, said inner sidewall of said panel joining member having an aperture formed therethrough which is positioned to align with said fastener-receiving cavity when said one end of said panel is received with said panel-receiving cavity;

at least one stop member formed on said panel joining member adjacent to said panel-receiving cavity against which said one end of said panel abuts when fully inserted into said panel-receiving cavity;

a screw-threaded fastener removably insertable through said aperture of said inner sidewall of said panel joining member and into said fastener-receiving cavity to enable said fastener to engage said panel and urge the outer surface of said panel against the outer sidewall of said panel joining member, said fastener-receiving cavity including an aperture to receive a nut into which said fastener can be screwed, the panel joining member and the nut cooperatively engaging to lock the nut against the inner sidewall of the panel joining member; and an adapter having an open end located in said fastener-receiving cavity, the adapter having a shape complementary to that of said fastener-receiving cavity.

23. The panel joint according to claim 22, further comprising:

an adapter to receive said fastener and for insertion into said fastener-receiving cavity, the adapter comprising an opening having an open end having a mouth and a closed end, to receive said fastener, the mouth of the opening having a diameter greater than that of said fastener.

24. The panel joint according to claim 23, wherein the opening includes a narrowing at its closed end to grip the end of a fastener.

25. The panel joint according to claim 24, wherein the opening and the narrowing are cylindrical.

26. The panel joint according to claim 25, wherein the cylindrical opening and the narrowing are co-axial.

27. The panel joint according to claim 22, further comprising:

an adhesive disposed between the panel and at least one sidewall of the panel joining member to increase the strength of the joint.

28. The panel joint according to claim 27, further comprising:

an adapter located in said fastener-receiving cavity, the adapter having a shape complementary to that of said fastener-receiving cavity.

29. The panel joint according to claim 22, wherein the adapter narrows away from its open end to ensure that the material from which the adapter is formed undergoes plastic flow around the fastening member as the fastening member is fully engaged.

30. The panel joint according to claim 22, wherein said fastener includes a screw thread to engage the panel joining member.

31. The panel joint according to claim 22, wherein said fastener is aligned along an axis which is at an angle inclined to the axis perpendicular to the surface of the panel.

32. A panel joint, comprising:

a panel having an inner surface, an outer surface, at least one end and a fastener-receiving cavity formed within said panel which opens onto said inner surface, generally adjacent to said one end of said panel;

a panel joining member having opposed, spaced-apart inner and outer sidewalls which define therebetween a panel-receiving cavity for receipt therein of said one end of said panel, said inner sidewall of said panel joining member having an aperture formed therethrough which is positioned to align with said fastener-receiving cavity when said one end of said panel is received with said panel-receiving cavity;

at least one stop member formed on said panel joining member adjacent to said panel-receiving cavity against which said one end of said panel abuts when fully inserted into said panel-receiving cavity;

a screw-threaded fastener removably insertable through said aperture of said inner sidewall of said panel joining member and into said fastener-receiving cavity to enable said fastener to engage said panel and urge the outer surface of said panel against the outer sidewall of said panel joining member, said fastener-receiving cavity including an aperture to receive a nut into which said fastener can be screwed, the panel joining member and the nut cooperatively engaging to lock the nut against the inner sidewall of the panel joining member;

an adapter located in said fastener-receiving cavity, the adapter having a shape complementary to that of said fastener-receiving cavity; and an adhesive disposed between the panel and at least one sidewall of the panel joining member to increase the strength of the joint.

33. The panel joint according to claim 32, further comprising:

an adapter to receive said fastener and for insertion into said fastener-receiving cavity, the adapter comprising an opening having an open end having a mouth and a closed end, to receive said fastener, the mouth of the opening having a diameter greater than that of said fastener.

34. The panel joint according to claim 33, wherein the opening includes a narrowing at its closed end to grip the end of a fastener.

35. The panel joint according to claim 34, wherein the opening and the narrowing are cylindrical.

36. The panel joint according to claim 35, wherein the cylindrical opening and the narrowing are co-axial.

37. The panel joint according to claim 32, further comprising:

an adapter having an open end located in said fastener-receiving cavity, the adapter having a shape complementary to that of said fastener-receiving cavity.

38. The panel joint according to claim 37, wherein the adapter narrows away from its open end to ensure that the material from which the adapter is formed undergoes plastic flow around the fastening member as the fastening member is fully engaged.

39. The panel joint according to claim 32, wherein said fastener includes a screw thread to engage the panel joining member.

40. The panel joint according to claim 32, wherein said fastener is aligned along an axis which is at an angle inclined to the axis perpendicular to the surface of the panel.

41. A panel joint, comprising:

a panel having an inner surface, an outer surface, at least one end and a fastener-receiving cavity formed within said panel which opens onto said inner surface, generally adjacent to said one end of said panel;

a panel joining member having opposed, spaced-apart inner and outer sidewalls which define therebetween a panel-receiving cavity for receipt therein of said one end of said panel, said inner sidewall of said panel joining member having an aperture formed therethrough which is positioned to align with said fastener-receiving cavity when said one end of said panel is received with said panel-receiving cavity;

at least one stop member formed on said panel joining member adjacent to said panel-receiving cavity against which said one end of said panel abuts when fully inserted into said panel-receiving cavity; and a screw-threaded fastener removably insertable through said aperture of said inner sidewall of said panel joining member and into said fastener-receiving cavity to enable said fastener to engage said panel and urge the outer surface of said panel against the outer sidewall of said panel joining member, said fastener-receiving cavity including an aperture to receive a nut into which said fastener can be screwed, the panel joining member and the nut cooperatively engaging to lock the nut against the inner sidewall of the panel joining member, and wherein said fastener is aligned along an axis which is at an angle inclined to the axis perpendicular to the surface of the panel.

42. The panel joint according to claim 41, further comprising:

an adapter to receive said fastener and for insertion into said fastener-receiving cavity, the adapter comprising an opening having an open end having a mouth and a closed end, to receive said fastener, the mouth of the opening having a diameter greater than that of said fastener.

43. The panel joint according to claim 42, wherein the opening includes a narrowing at its closed end to grip the end of a fastener.

44. The panel joint according to claim 43, wherein the opening and the narrowing are cylindrical.

45. The panel joint according to claim 44, wherein the cylindrical opening and the narrowing are co-axial.

46. The panel joint according to claim 41, further comprising:

an adhesive disposed between the panel and at least one sidewall of the panel joining member to increase the strength of the joint.

47. The panel joint according to claim 46, further comprising:

an adapter located in said fastener-receiving cavity, the adapter having a shape complementary to that of said fastener-receiving cavity.

48. The panel joint according to claim 41, further comprising:

an adapter having an open end located in said fastener-receiving cavity, the adapter having a shape complementary to that of said fastener-receiving cavity.

49. The panel joint according to claim 48, wherein the adapter narrows away from its open end to ensure that the material from which the adapter is formed undergoes plastic flow around the fastening member as the fastening member is fully engaged.

50. The panel joint according to claim 41, wherein said fastener includes a screw thread to engage the panel joining member.

51. In a method of connecting a panel to a panel joining member employing a panel assembly of the type comprising, a panel having an inner surface, an outer surface, and at least one end, a panel joining member having opposed, spaced-apart inner and outer sidewalls which define therebetween a panel-receiving cavity, said inner sidewall of said panel joining member having an aperture formed therethrough, at least one stop member formed on said panel joining member adjacent to said panel-receiving cavity, and a fastener including a screw-thread, the method comprising the steps of:

forming a fastener-receiving cavity within said panel which opens onto said inner surface, generally adjacent to said one end of said panel, wherein the fastener-receiving cavity has an open end and narrows away from its open end;

forming an aperture in the open end of said fastener receiving cavity and inserting said one end of said panel into said panel-receiving cavity of said panel joining member;

abutting said one end of said panel against said one stop member and aligning said fastener-receiving cavity of said panel with said aperture of said inner sidewall of said panel joining member; and inserting said fastener through said aperture of said inner sidewall of said panel joining member and screwing the fastener into a nut and into said fastener-receiving cavity of said panel to enable said fastener to engage said panel and urge the outer surface of said panel against the outer sidewall of said panel joining member, the nut and the panel joining member operating to lock the nut against the inner sidewall of the panel joining member.

52. The method according to claim 51, comprising the further step of:

inserting a receiver into said fastener-receiving cavity prior to the panel being inserted within the panel joining member.

53. The method according to claim 52, comprising the further step of:

introducing an adhesive between the panel and at least one of the sidewalls of the panel joining member.

54. The method according to claim 53, comprising the further step of:

substantially tightening said fastener and forming an adhesive bond weld between the panel and the sidewall of the panel joining member when the fastener has been tightened substantially.

55. The method according to claim 52, wherein the receiver is an adapter, the adapter having a shape complementary to that of the fastener-receiving cavity.

56. The method according to claim 52, additionally including the step of introducing said fastener into the receiver at an angle inclined to the axis perpendicular to the surface of the panel.

57. The method according to claim 51, wherein the fastener is an expanding rivet fastener to enable it to engage the panel tightly.

58. The method according to claim 51, wherein the fastener has a screw-thread to engage at least one of said panel and said panel joining member.

59. The method according to claim 51, wherein the panel includes at least one projection to engage a corresponding recess in a panel joining member thereby forming a push-fit type joint.

60. The method according to claim 51, wherein opposing sidewalls of the panel joining member are inclined together at an angle of up to 5°.

61. The method according to claim 60, wherein the incline angle is from 0.7° to 2°.

* * * * *